(12) United States Patent  
Mui et al.

(10) Patent No.: US 8,310,735 B2
(45) Date of Patent: Nov. 13, 2012

(54) IMAGE CAPTURE MODULE SUPPORT

(75) Inventors: Paul K. Mui, Boise, ID (US); Eric L. Andersen, Meridian, ID (US); Scott A. Putz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 383 days.

(21) Appl. No.: 12/694,737

(22) Filed: Jan. 27, 2010

(65) Prior Publication Data

US 2011/0181924 A1   Jul. 28, 2011

(51) Int. Cl.
*H04N 1/04* (2006.01)
(52) U.S. Cl. ......... 358/474; 358/497; 358/498; 358/496
(58) Field of Classification Search ................... 358/474, 358/497, 498, 496
See application file for complete search history.

(56) References Cited

U.S. PATENT DOCUMENTS

| | | | |
|---|---|---|---|
| 5,734,483 A | 3/1998 | Itoh | |
| 5,857,133 A * | 1/1999 | Sun | 399/211 |
| 6,091,516 A | 7/2000 | Chang et al. | |
| 6,278,101 B1 * | 8/2001 | Puyot | 250/208.1 |
| 6,661,537 B1 | 12/2003 | Khovaylo | |
| 6,762,864 B2 * | 7/2004 | Kao | 358/497 |
| 6,801,343 B1 * | 10/2004 | Sheng | 358/474 |
| 6,801,731 B2 | 10/2004 | Parker | |
| 7,072,082 B2 | 7/2006 | Yokota | |
| 7,136,203 B2 | 11/2006 | Yokota et al. | |
| 7,180,641 B2 | 2/2007 | Chang et al. | |
| 7,391,544 B2 | 6/2008 | Yokota | |
| 7,522,318 B2 | 4/2009 | Lee | |
| 7,554,701 B2 | 6/2009 | Hong et al. | |
| 7,804,625 B2 * | 9/2010 | Osakabe | 358/474 |
| 2006/0209364 A1 | 9/2006 | Nagatani | |

* cited by examiner

*Primary Examiner* — Houshang Safaipour
(74) *Attorney, Agent, or Firm* — Garry A. Perry

(57) ABSTRACT

In one embodiment, an apparatus includes a transparent platen supported over an inside of a tub, an elongated member situated in the tub in a horizontal plane, a plurality of biasing members operatively connected to the elongated member, and a plurality of gap-maintaining members operable to connect to an image capture module and operatively connected to the platen. The elongated member is movable within a tub in a vertical plane, to movably support an image capture module in a horizontal plane. The biasing members are operable to urge the elongated member towards the platen. The gap-maintaining members are operable to maintain a constant distance between platen and an image capture module.

16 Claims, 11 Drawing Sheets

IMAGE CAPTURE MODULE SUPPORT

BACKGROUND

The present disclosure relates to scanners, particularly those scanners known as flatbed scanners. Scanners create electronic data representative of a scanned target. Such electronic data can be used by a computer or other machine to reproduce an image of the scanned object for display or for printing. Flatbed scanners have a flat, transparent platen which serves as both the scanning area and a surface to hold a target (e.g. a paper document or photograph) to be scanned.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Flatbed scanners often include an image capture module, which module may include optics, a photosensitive conductor, and electronics to scan a target by sequentially imaging narrow strips or scan line portions of the target. The scanning operation produces electronic data which is representative of each scan line portion of the target. In one category of flatbed scanners, the transparent platen and target remain stationary and the image capture module moves relative to the target across the transparent platen so as to image the target one line portion at a time. Inconsistent or poor image quality may occur when using such a scanner if the distance between the image capture module and the platen is not constant throughout the scanning operation. The distance between the image capture module and the platen may vary as the image capture module moves along the length of the platen for a variety of reasons, including inconsistent part tolerances and part variations (e.g. errors in the dimensions of the manufactured platen or structure that supports the platen), and/or flexing of the platen, including flexing due to a user loading a heavy object on the platen for scanning.

Embodiments described below were developed in an effort to reduce variations in the distance between an image capture module and a platen, and to thereby reduce variations in focal length and improve the quality of the digital representations of the images produced by a scanner. The embodiments shown in the accompanying drawings and described below are non-limiting examples. Other embodiments are possible and nothing in the accompanying drawings or in this Detailed Description of Embodiments should be construed to limit the scope of the disclosure, which is defined in the Claims.

Figure 1:
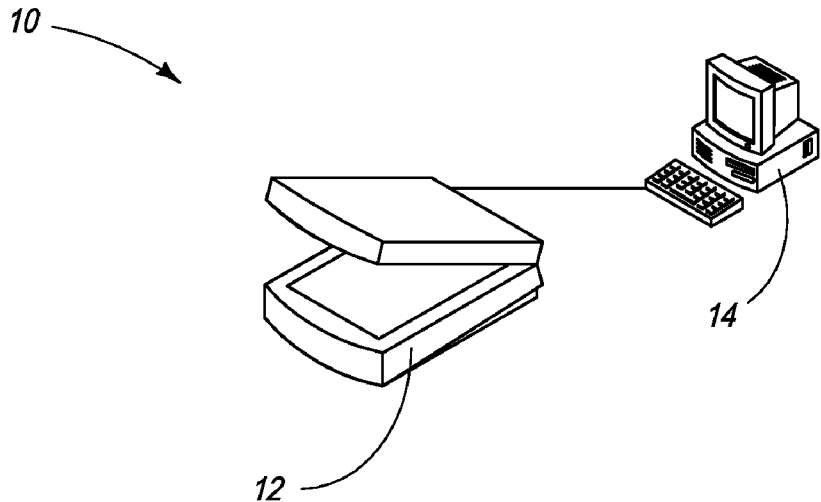
FIG. 1 depicts an exemplary environment in which various embodiments may be implemented.

FIG. 1 depicts an exemplary environment 10 in which various embodiments may be implemented. Environment 10 is shown to include scanner 12. Scanner 12 represents generally an assembly of components configured to scan a target by sequentially imaging narrow strips or scan line portions of a target. Scanner 12, for example, may be used for scanning printed documents, photographs, maps and the like. Host 14 represents generally any computing device capable of receiving electronic data which is representative of a target (hereinafter "scan data") from the scanner 12. Host 14 may also supply a user interface allowing a user to obtain status information and to configure scanner 12. In an embodiment, scanner 12 may operate in conjunction with one or more host computing devices capable of receiving scan data from scanner 12. In an embodiment, scanner 12 connects directly or indirectly with a host 14. In an embodiment scanner 12 connects to a host 14 via a cable or wireless or other means in a manner such that host 14 may receive instructions and scan data from scanner 12. In another embodiment, scanner 12 may connect directly to one or more hosts 14 via the Internet. In an embodiment scanner 12 may operate in a standalone mode without being connected to host 14, the scanner 12 being configured to send scan data via the Internet, email or an external memory device.

Figure 2:
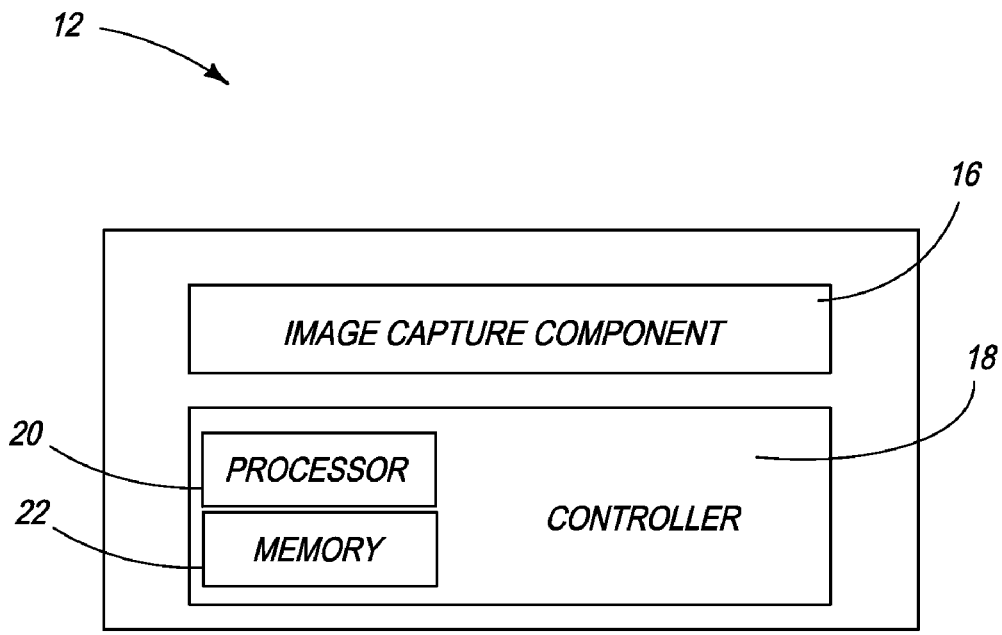
FIG. 2 depicts an exemplary diagram depicting the physical and logical components of a scanner according to an embodiment.

FIG. 2 is an exemplary block diagram of scanner 12 according to an embodiment. In this example, scanner 12 is shown to include an image capture component 16 and a controller 18. Image capture component 16 represents generally any combination of hardware and programming capable, in conjunction with a controller 18, scanning a target by sequentially imaging narrow strips or scan line portions of the target. In a given example, image capture component 16 may include a platen, an image capture module, an elongated member and an actuator system to move the image capture module along a length of the elongated member. Scanner 12 is shown to include a controller 18. As used in this specification, controller 18 represents generally any combination of elements capable of coordinating the operation of the image capture module 28. In a given implementation, the controller 18 includes a processor 20 and a memory 22. The processor 20 may represent multiple processors, and the memory 22 may represent multiple memories. In an embodiment, the controller 18 may include a number of software components that are stored in a computer-readable medium, such as memory 22, and are executable by processor 20.

Figure 3:
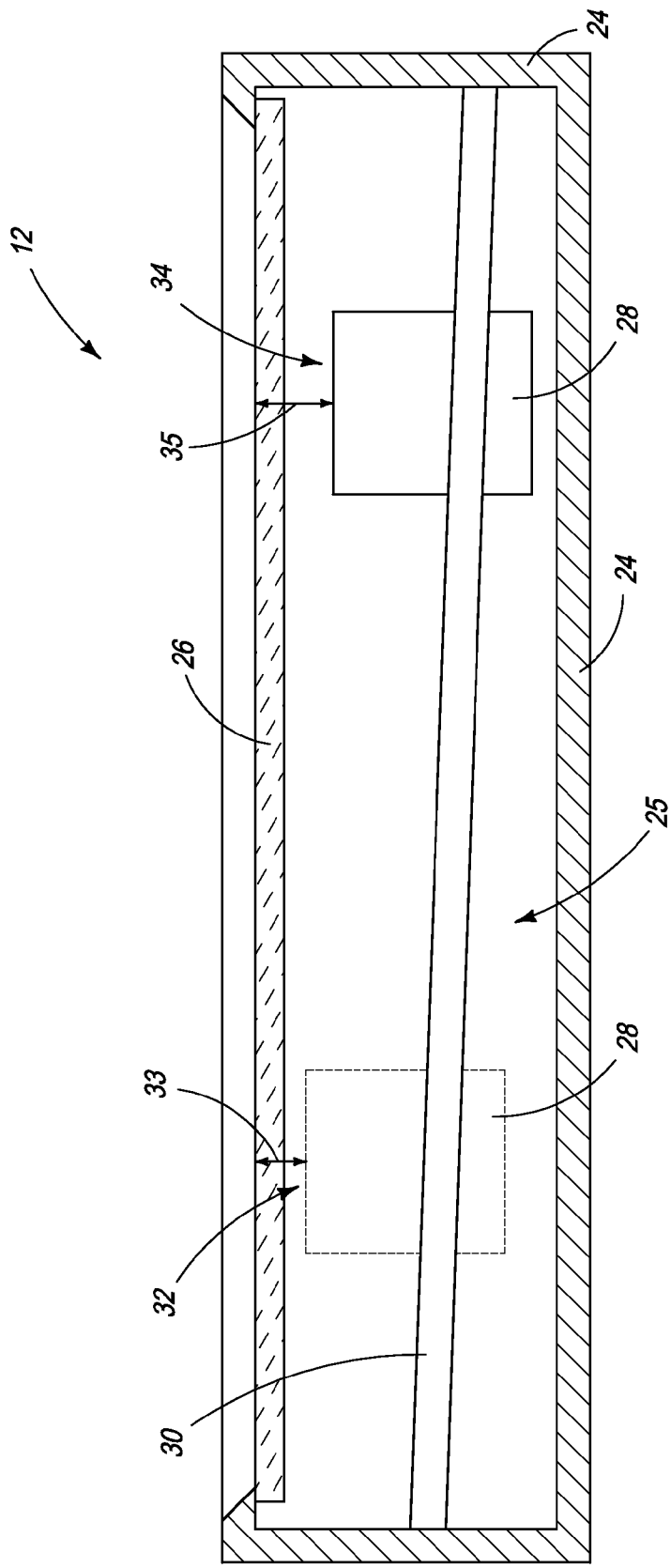
FIG. 3 is a side view of a scanner illustrating changes in the distance between an image capture module and a platen due to part tolerance variations.

FIG. 3 is a side view of an embodiment of a scanner illustrating changes in the distance between an image capture module 28 and a platen due to part tolerance variations. Exemplary Scanner 12 includes a tub 24, a transparent platen 26 supported over an inside 25 of the tub 24, an image capture module 28 and an elongated member 30. In this example the platen 26 is a transparent glass platen. The image capture module 28 is depicted in a first position 32 and a second position 34. FIG. 3 illustrates that a first distance 33 between the image capture module 28 and the platen 26 when the image capture module 28 is in the first position 32 is not the same as a second distance 35 between the image capture module 28 and the platen 26 when the image capture module 28 is in the second position 34. These inconsistent distances can cause inconsistent scan focal lengths during scanning operations. In this example, the inconsistent distances between the image capture module 28 and the platen 26 when comparing the first and second positions may be attributable to part tolerance variations in the elongated member 30. The exemplary scanner 12 is designed to include an elongated member 30 with no slope, but defects in the elongated member 30 cause the illustrated elongated member 30 to have a negative slope as viewed in FIG. 3, and cause the image capture module 28 that it supports to be at inconsistent distances from the platen 26 as the image capture module 28 traverses the elongated member 30.

Figure 4:
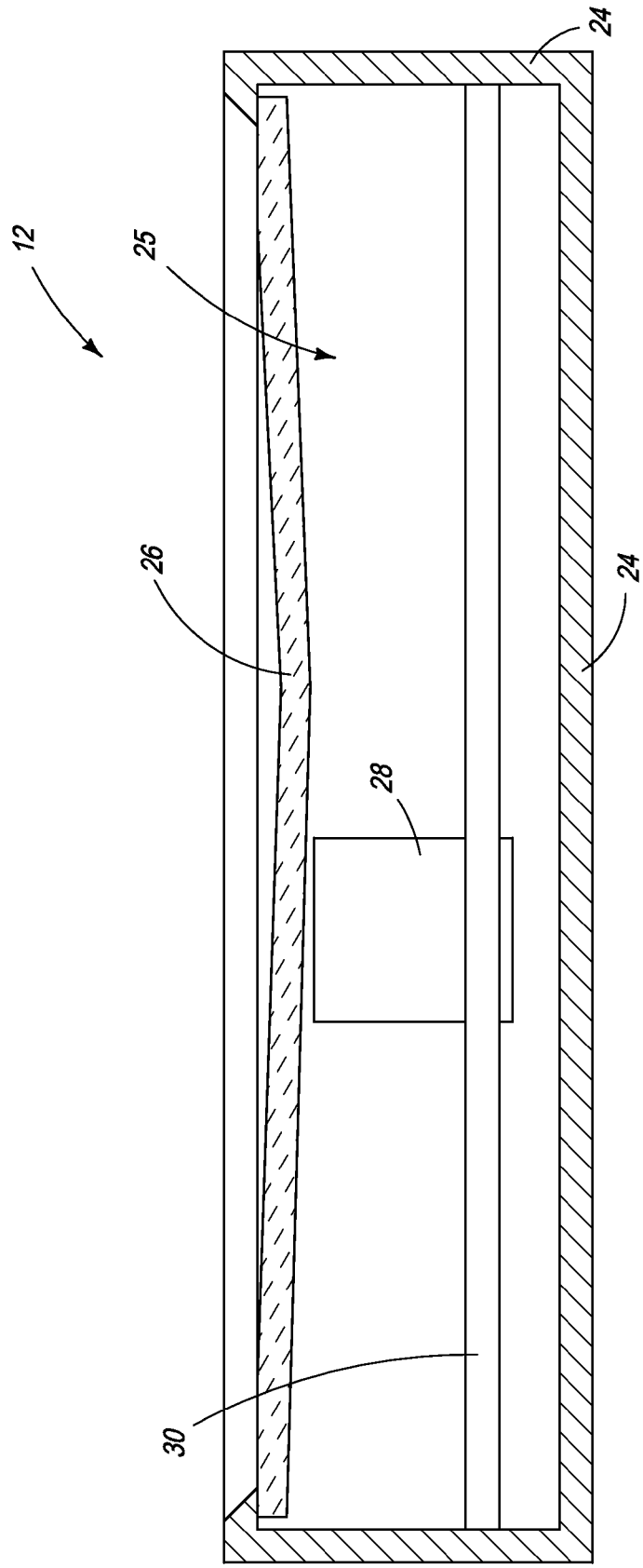
FIG. 4 is a side view of a scanner illustrating changes in the distance between an image capture module and a platen due to platen flexing.

FIG. 4 is a side view of an exemplary scanner illustrating inconsistent distances between an image capture module 28 and a platen 26 due to platen flexing. FIG. 2 illustrates flexing or bowing of a transparent glass platen that might occur if a user places one heavy object, or a number of heavy objects upon the platen 26 for scanning. For example, bowing or flexing may occur if the scanner 12 is used to scan heavy books or albums. Such flexing or bowing results in inconsistent distances between the image capture module 28 and the platen 26 as the image capture module 28 traverses the elongated member 30 and causes inconsistent scan focal lengths during imaging operations.

Figure 5:
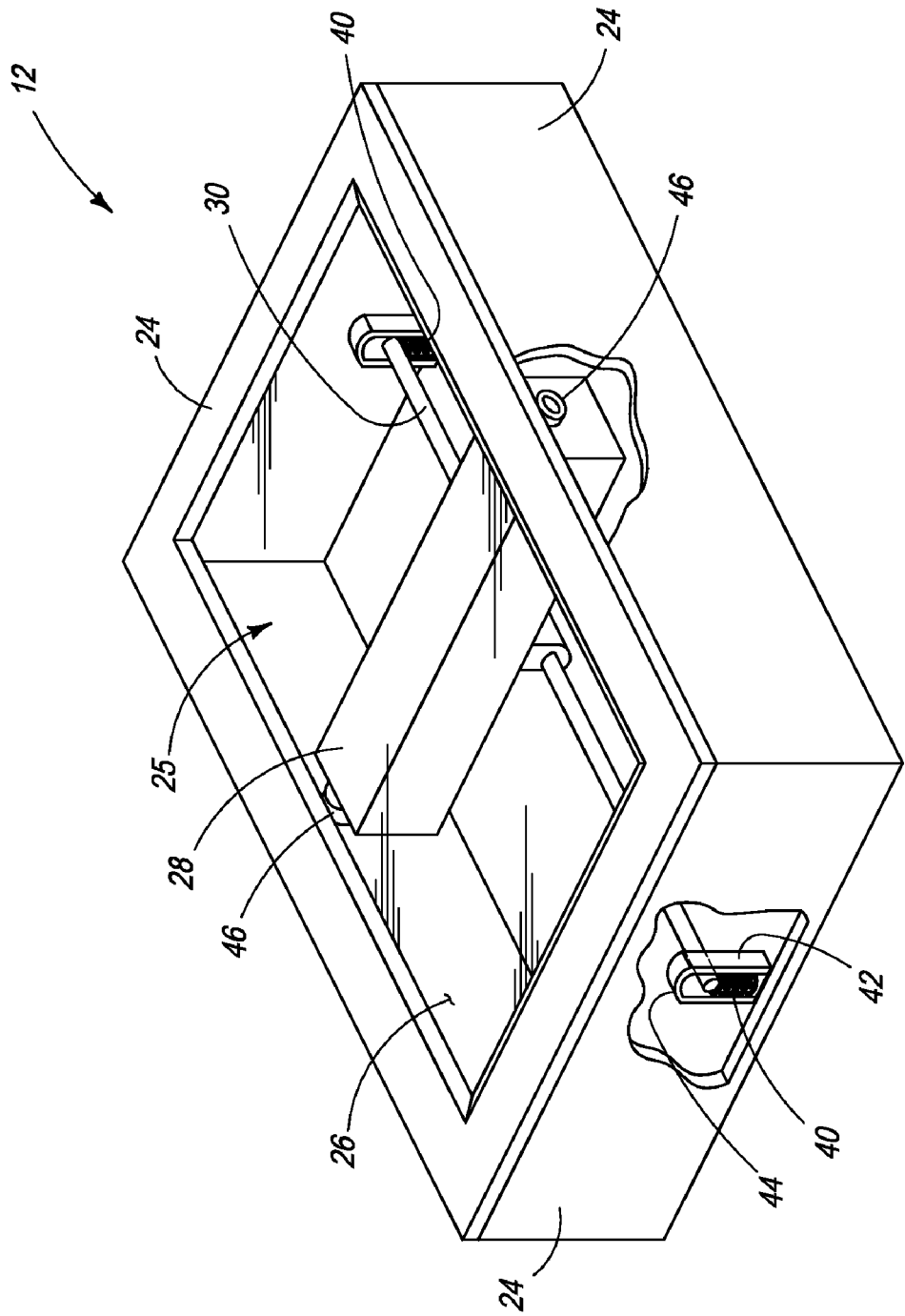
FIG. 5 is a perspective view illustrating one embodiment of a scanner.
Figure 6:
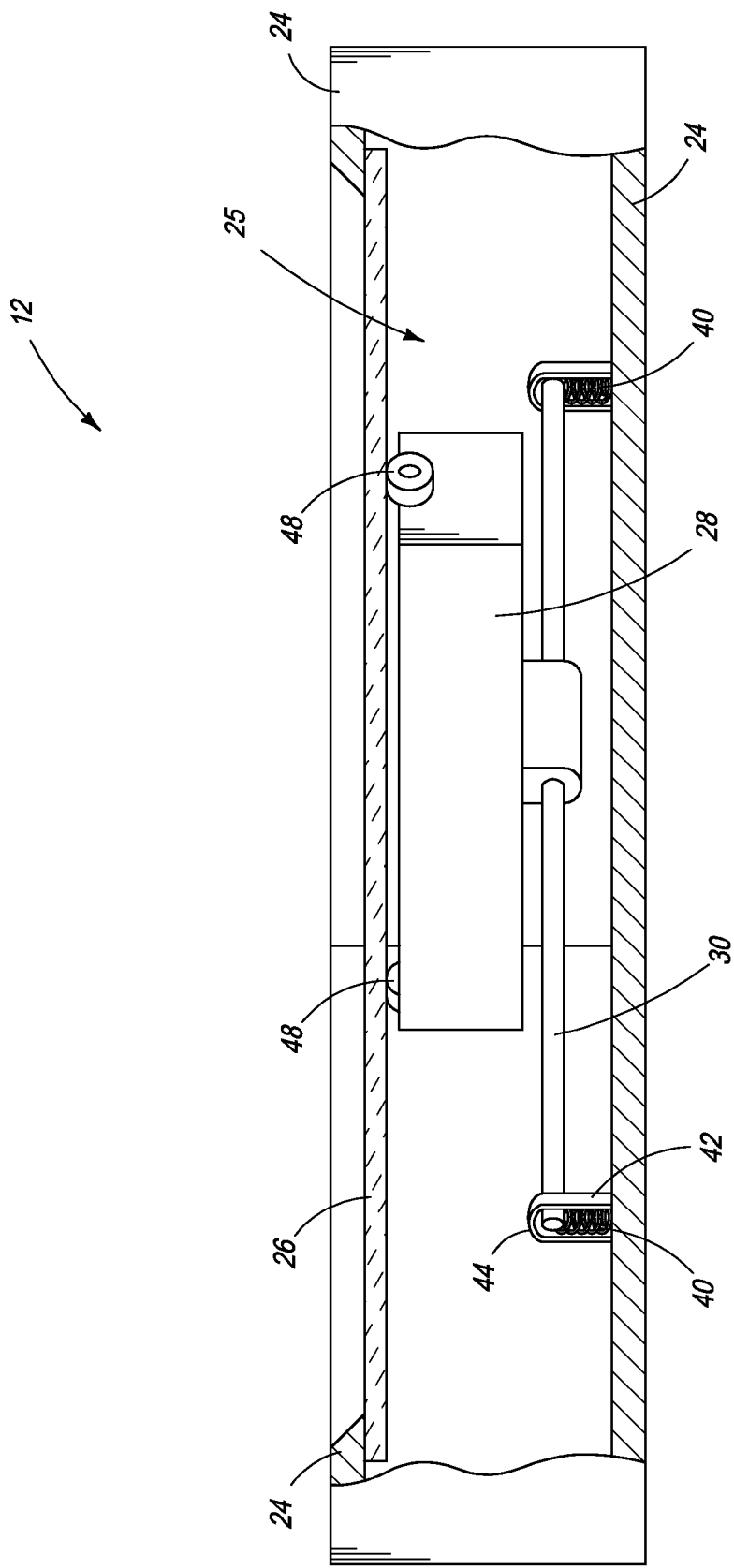
FIG. 6 is a horizontal perspective view of the scanner of FIG. 5.
Figure 7:
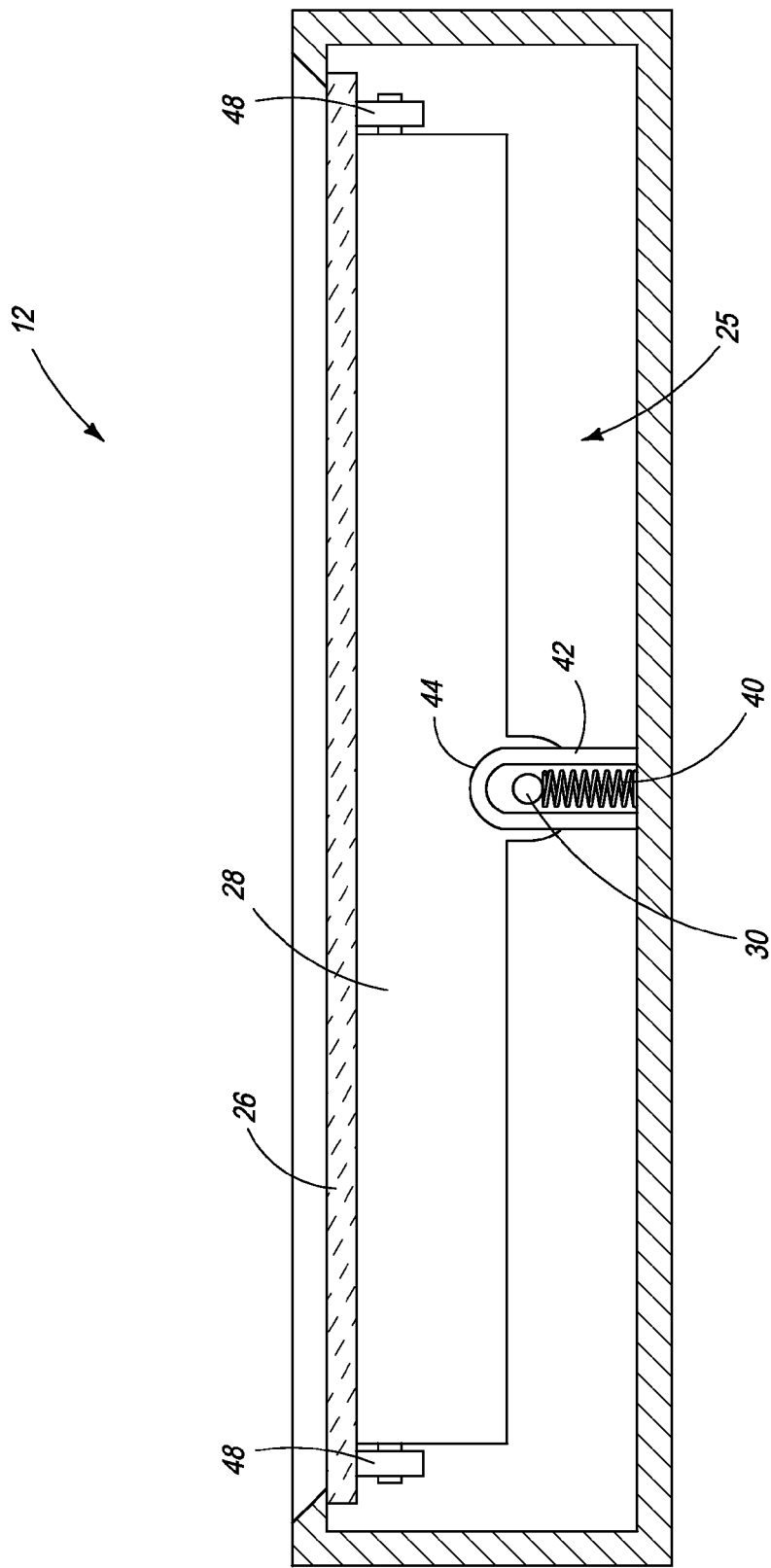
FIG. 7 is an end view of the scanner of FIG. 5.

FIG. 5 is a perspective view illustrating one embodiment of a scanner. FIG. 6 is a horizontal perspective view of the scanner of FIG. 5. FIG. 7 is an end view of the scanner of FIG. 5. Scanner 12 includes a tub 24, a transparent platen 26, an image capture module 28, an elongated member 30, and biasing members 40. The tub 24 is a container that surrounds and protects physical and electronic components of the scanner 12, such as the image capture module 28, the elongated member 30, and biasing members 40. The tub 24 may include plastic and/or metal components, and may include a plurality of distinct faces or portions, e.g. a front, rear, left side, right side, top, and/or bottom portion(s) that may be connected by screws, bolts, rivets, adhesive or other attachment means assembled to construct the tub 24. Alternatively, the tub 24 may be a one-piece tub.

In an embodiment a platen 26 is supported over an inside 25 of the tub 24. In an embodiment, the platen 26 is supported over an inside 25 of the tub by an upper portion of the tub 24. In an embodiment, the platen 26 is supported over an inside 25 of the tub by the front, rear, left and right sides of the tub 24. In an embodiment the platen 26 may be supported over an inside 25 the tub 24 by a structure that is not a part of the tub 24.

In an embodiment, the platen 26 is transparent and composed of clear glass and is substantially flat on its upper and lower surfaces, the upper surface to engage with a target, or nearly engage with a target, and the lower surface to engage with one or more gap-maintaining members 46. In an embodiment, gap-maintaining members may include rollers, operable to roll against the platen 26 and maintain a constant distance between the image capture module 28 and the platen. In an embodiment, gap-maintaining members may include pads, operable to slide against the platen 26 and maintain a constant distance between the image capture module 28 and the platen. In another embodiment, the platen 26 may be substantially flat and composed of a transparent plastic. As used in this specification and the appended claims, "transparent" means having the property of allowing light to pass through. In an embodiment the platen 26 may be constructed of transparent colored glass or transparent colored plastic.

In an embodiment, there may be more than one platen. For example, in an embodiment a scanner may include a flatbed platen and a step platen. The flatbed platen may be used to support a target for scanning and in setting the focal point for the image capture module 28 for scanning operations in which the target is stationary and the image capture module 28 is moved relative to the target. In an embodiment, a step platen is used for ADF (Automatic Document Feeder) scanning wherein the scanned page is moved pass the step platen and the image capture module 28 parks beneath the step platen and remains stationary, scanning as documents fed by the ADF move past the image capture module 28. In an embodiment the scanner may support ADF scanning and have one platen.

Located within the tub 24 of the scanner 12 in a plane parallel to the plane of a platen is an elongated member 30, to support an image capture module 28 such that the image capture module 28 may be moved along a length of the elongated member 30. The elongated member 30 may have a length substantially the same as the length of the platen 26. In an embodiment in which a scanner includes more than one platen, the elongated member may have a length substantially the same as the combined lengths of the platens. In an embodiment, the elongated member may be in the form of a rail. As used in this specification and the appended claims, "rail" includes a bar, track or other rigid elongated element to movably support. In embodiments, the elongated member may be in the shape of a cylinder or a prism, including but limited to a rectangular prism or a triangular prism. In an embodiment the elongated member 30 may by fully or partially composed of a plastic. The elongated member 30 is movable within the tub 24 in a plane perpendicular to the plane of the platen 26 by virtue of the elongated member's operative connection to biasing members 40. The biasing members 40 operatively connect to the tub 24, and to the elongated member 30, to bias the elongated member 30 towards the platen 26. In an embodiment the biasing members 40 include compression springs, which compression springs may attach to the floor of the tub 24 and to a surface of the elongated member 30 that is opposite the platen 26. In the exemplary embodiment, the number of biasing members is two. In other embodiments, the number of biasing members may three, or four, or more than four.

In an embodiment, the elongated member 30 is operatively connected to a plurality of guides 42, to keep movement of the elongated member aligned in a plane perpendicular to the plane of the platen 26. In an embodiment the guides 42 are situated at the ends of the elongated member 30 and operatively connect to the ends of the elongated member. In an embodiment, the guides 42 are a molded extension of the tub 24. In an embodiment, the guides 42 are distinct elements that are attached to the tub 24. In an embodiment, each guide 42 includes a slot oriented in a plane perpendicular to the plane of the platen 26, and a compression spring is disposed in the slot. In this case, the slot supports the compression spring in addition to keeping movement of the elongated member aligned in a plane perpendicular to the plane of the platen 26. In an embodiment the guide 42 with a slot includes a cap 44, which may be a horizontal structure at the top of the guide 42 such that the cap 44 provides a limit to the distance the elongated member 30 can be biased towards the platen 26. In the exemplary embodiment, the number of guides is two. In other embodiments, the number of biasing members may three, or four, or more than four.

In an embodiment, the elongated member 30 movably supports an image capture module 28 such that the image capture module 28 may be moved along a length of the elongated member 30. In an embodiment the image capture module 28 houses an illumination system and an optical system. The illumination system may include an illumination source, such as LED's, one or more fluorescent bulbs, or other illumination means, to illuminate a portion of a target (commonly referred to as a "scan region") to facilitate scanning. The optical system may include optics and a photosensitive conductor, with the optics to collect light reflected by an illuminated target and focus a small area of the illuminated target (commonly referred to as a "scan line") onto the surface of the photosensitive detector.

A plurality of gap-maintaining members 46, operatively connect between the image capture module 28 and the platen 26 to maintain a constant distance between the image capture module 28 and the platen 26. As used in this specification and the appended claims, "gap-maintaining member" may include any part, element or member that connects between an image capture module and a platen to maintain a constant distance between the image capture module and the platen. In the exemplary embodiment, the gap-maintaining members 46 include rollers 48 operable to roll against the platen 26, with each gap-maintaining member 46 having a substantially equal height so that the distance between the image capture module 28 and the platen is constant. In an embodiment the rollers 48 are fully or partially composed of a plastic material, and may attach via a pin to the image capture module 28 such that rollers 48 roll against the platen at the platen's edges to decrease the optical impact of any marring of the platen surface by the rollers 48. In embodiments, the rollers 48 may be fully or partially composed of Delrin® or nylon.

Figure 8:
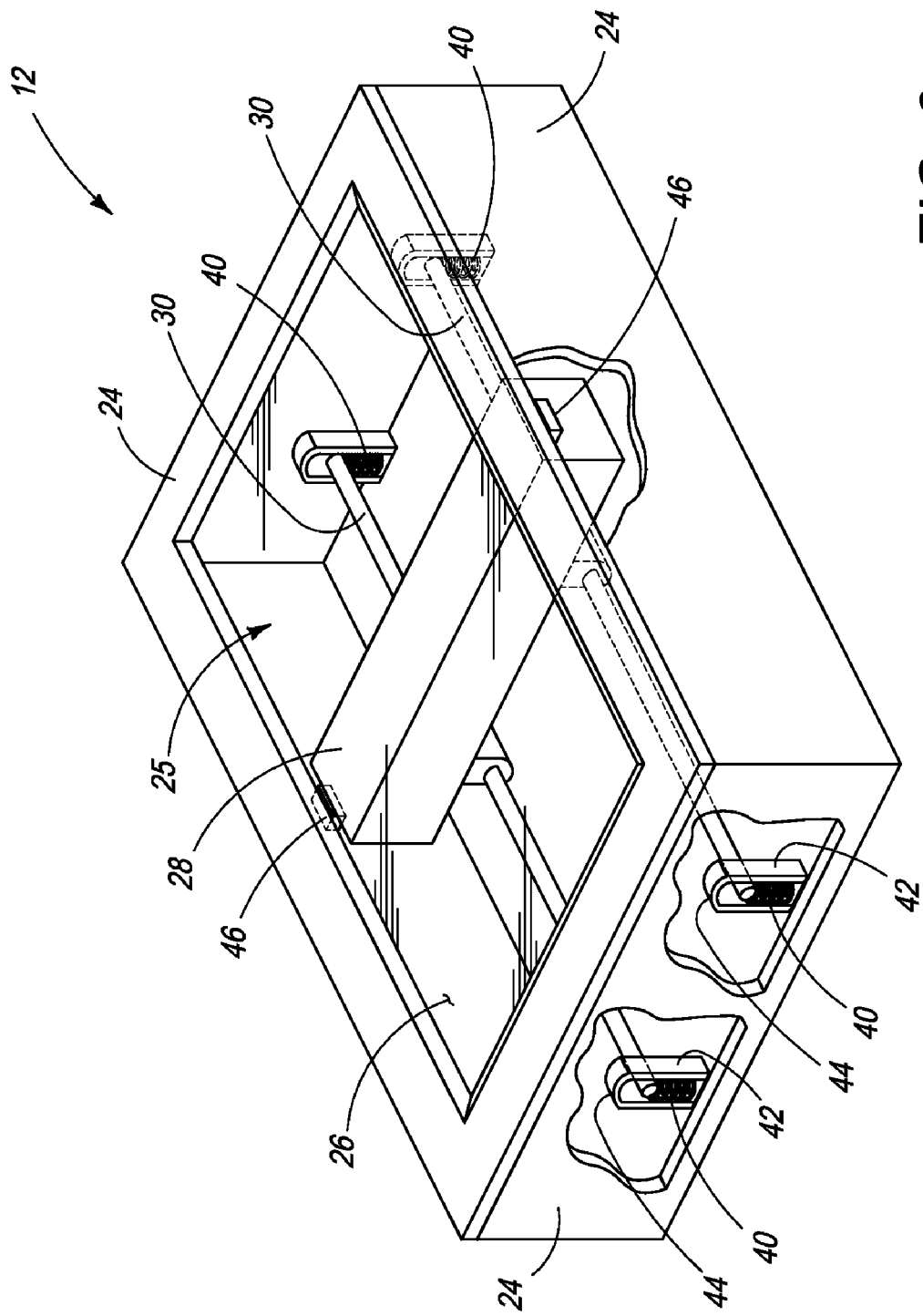
FIG. 8 is a perspective view illustrating one embodiment of a scanner.
Figure 9:
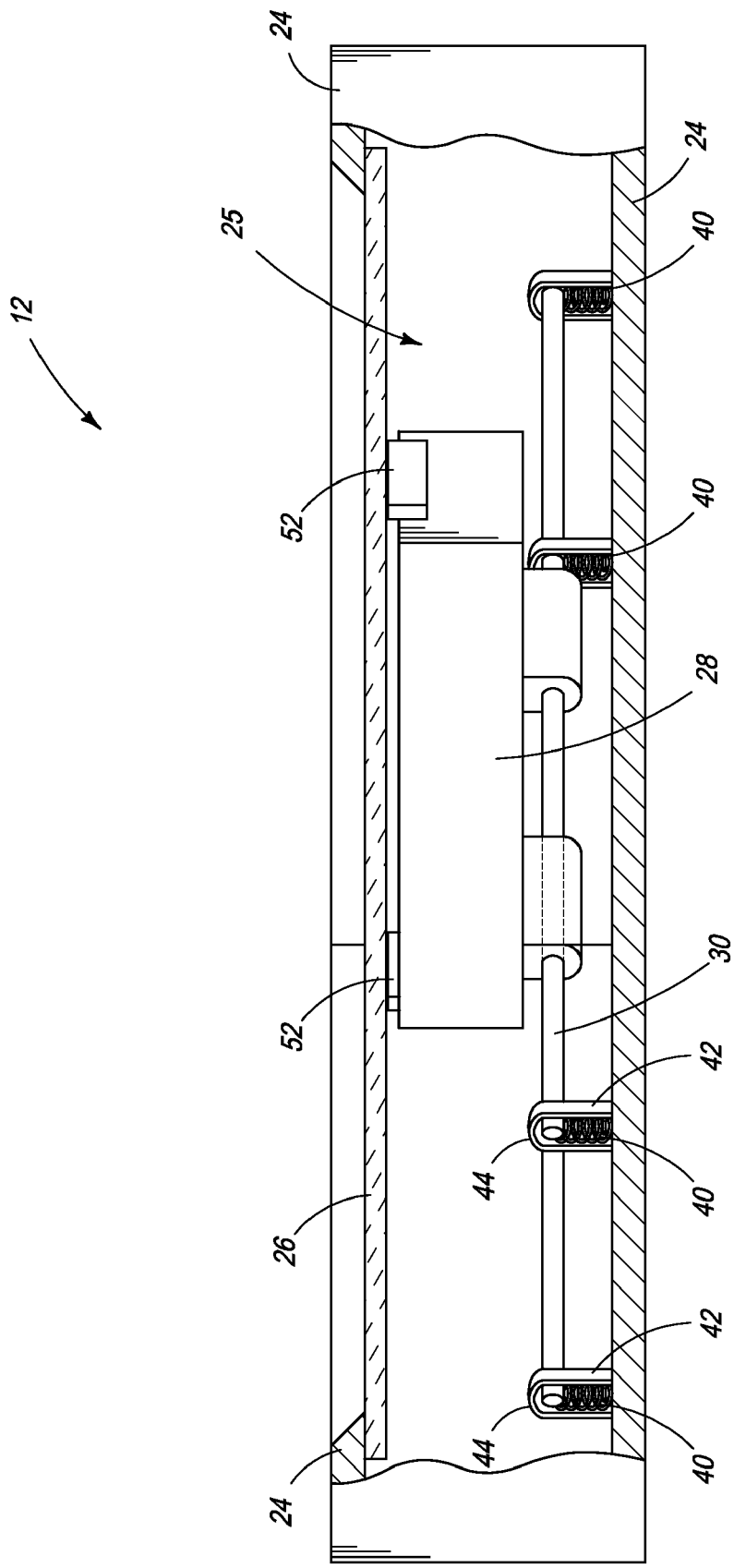
FIG. 9 is a horizontal perspective view of the scanner of FIG. 8.
Figure 10:
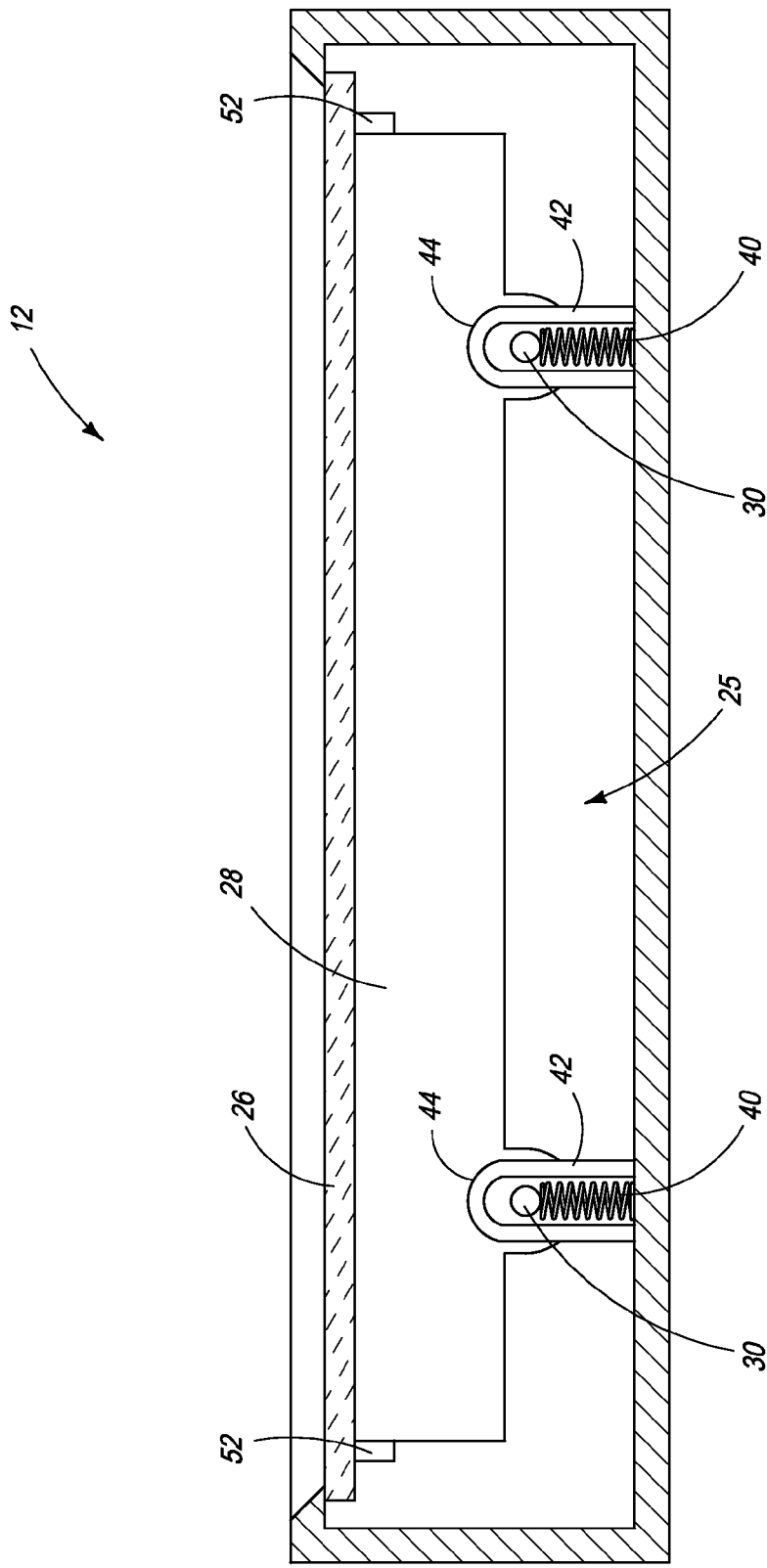
FIG. 10 is an end view of the scanner of FIG. 8.

FIG. 8 is a perspective view illustrating one embodiment of a scanner. FIG. 9 is a horizontal perspective view of the scanner of FIG. 8. FIG. 10 is an end view of the scanner of FIG. 8. Scanner 12 includes a tub 24, a transparent platen 26, an image capture module 28, and two elongated members 30. The tub 24 is a container that surrounds and protects physical and electronic components of the scanner 12, such the image capture module 28, and the elongated member 30. In an example, the tub 24 includes plastic and metal components, and includes a plurality of distinct faces or portions, e.g. a front, rear, left side, right side, top, and/or bottom portion(s) that may be connected by screws, bolts, rivets, adhesive or other attachment means assembled to construct the tub 24.

In the exemplary embodiment a platen 26 is rests on an upper portion of the tub 24 and is thus supported over an inside 25 of the tub 24. The platen 26 is transparent and composed of clear glass and is substantially flat on its upper and lower surfaces, the upper surface to engaged with a target, or nearly engage with a target.

In the exemplary embodiment, two elongated members 30 are located within the tub 24 of the scanner 12 in a horizontal plane. As used in this specification and the appended claims, "horizontal plane" means a plane perpendicular the longitudinal axis of the scanner in its designed operating orientation. As used in this specification and the appended claims, "longitudinal axis" means an imaginary axis extending through the center of the scanner from top to bottom. As used in this specification and the appended claims, "vertical plane" means a plane parallel to the longitudinal axis of the scanner. The two elongated members 30 may have lengths substantially the same as the length of the platen 26, and support an image capture module 28 such that the image capture module 28 may be moved along the lengths. In an embodiment in which a scanner includes more than one platen, the elongated members may have lengths substantially the same as the combined lengths of the platens. The first elongated member is situated parallel to the second elongated member, and each is movable within the tub in a vertical plane by virtue of the elongated members' operative connection to biasing members 40, to movably support the image capture module in a horizontal plane. The biasing members 40 operatively connect to the tub 24, and to the elongated members 30, to bias the elongated members 30 towards the platen 26. In the exemplary embodiment each of the biasing members 40 includes a compression spring 50, and attaches to the floor of the tub 24 and to a surface of the elongated member 30 that is opposite the platen 26.

In the exemplary embodiment, each of the two elongated members 30 is operatively connected to two guides 42, to keep movement of the elongated members 30 vertically aligned. In an embodiment the guides 42 are situated at the ends of the elongated member 30 and operatively connect to the ends of the elongated members. In an embodiment, the guides 42 are a molded extension of the tub 24. In an embodiment, the guides 42 are distinct elements that are attached to the tub 24. In an embodiment, each guide 42 includes a slot oriented in a vertical plane, and a compression spring is disposed in the slot. In this case, the slot supports the compression spring 50 in addition to keeping movement of the elongated members 30 aligned in a vertical plane. In an embodiment the guide 42 with a slot includes a cap 44, which may be a horizontal structure or an arch at the top of the guide 42 such that the cap 44 provides a limit to the distance the elongated member 30 can be biased towards the platen 26.

In the exemplary embodiment, the two elongated members 30 movably support an image capture module 28 such that the image capture module 28 may be moved along lengths of the elongated members 30. In an embodiment the image capture module 28 houses an illumination system and an optical system. A plurality of gap-maintaining members 46, operatively connect between the image capture module 28 and the platen 26 to maintain a constant distance between the image capture module 28 and the platen 26. In an embodiment, the gap-maintaining members 46 include pads 52 operable to slide against the platen 26, with each gap-maintaining member 46 having a substantially equal height so that the distance between the image capture module 28 and the platen is constant. In an embodiment the pads 52 are fully or partially composed of a plastic material and attach to the image capture module 28 such that pads 52 slide against the platen at the platen's edges to decrease the optical impact of any marring of the platen surface by the pads 52. In embodiments, the pads 52 include Teflon®, Delrin® or nylon.

In other embodiments, three, four, or more than four elongated members 30 may be located with the tub, movable within the tub in a vertical plane to movably support an image capture module in a horizontal plane. In other embodiments, three, four, or more than four guides 42 may operatively connect to elongated members 30 to keep movement of the elongated members 30 vertically aligned.

Figure 11:
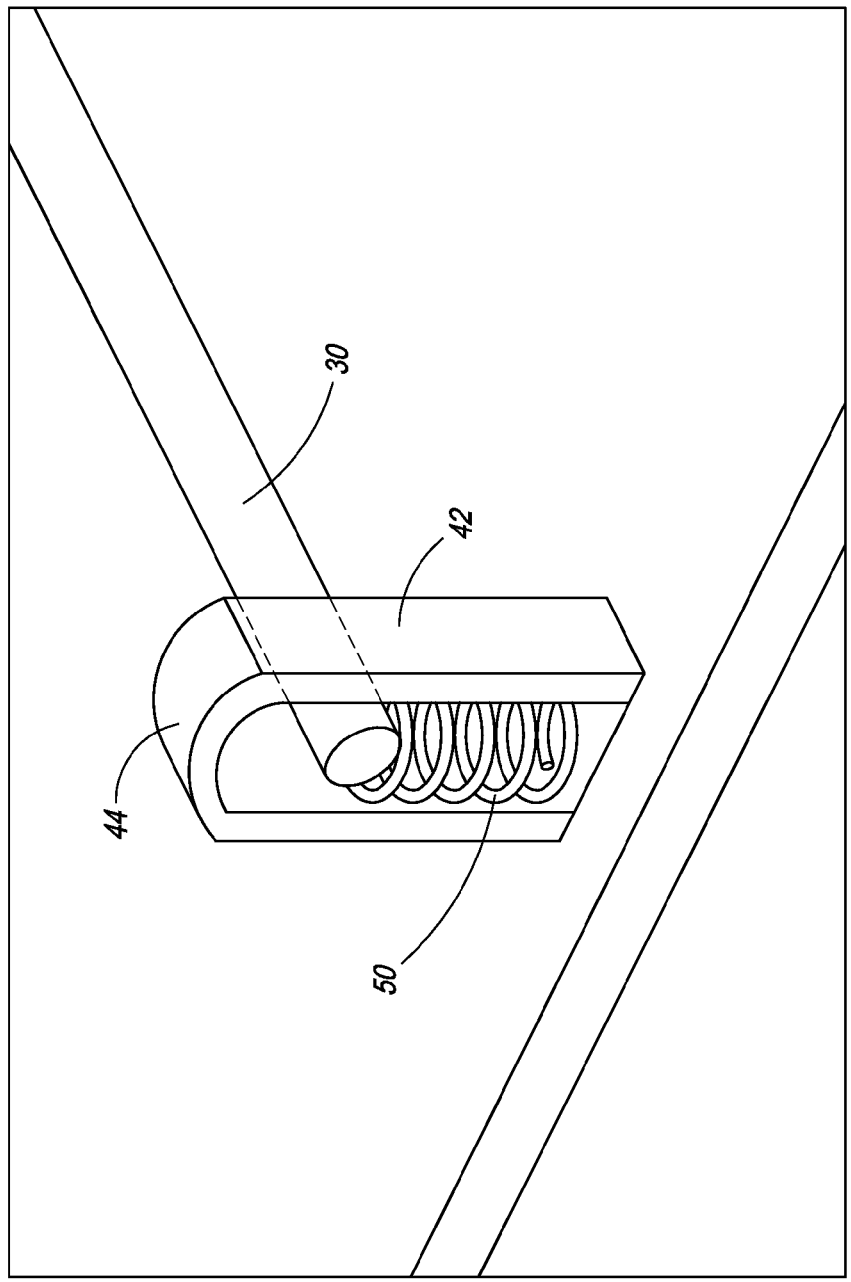
FIG. 11 is a detail view of one embodiment of an elongated member end, guide and compression spring.

FIG. 11 is a detail view of one embodiment of an elongated member end, guide and compression spring. In the exemplary embodiment, an elongated member 30 is operatively connected to a guide 42, at the elongated member's end, to keep movement of the elongated member aligned in a plane perpendicular to the plane of the platen 26. In an embodiment, the guide 42 is distinct element that is attached to the tub 24. The guide 42 includes a slot oriented in a plane perpendicular to the plane of the platen 26, and a compression spring 50 is disposed in the slot. The slot supports the compression spring 50 in addition to keeping movement of the elongated member aligned in a plane perpendicular to the plane of the platen 26. The guide 42 includes a cap 44, which may be a horizontal structure at the top of the guide 42 such that the cap 44 provides a limit to the distance the elongated member 30 can be biased towards the platen 26. The compression spring 50 attaches to the floor of the tub 24 and to a surface of the elongated member 30 that is opposite the platen 26.

Figure 12:
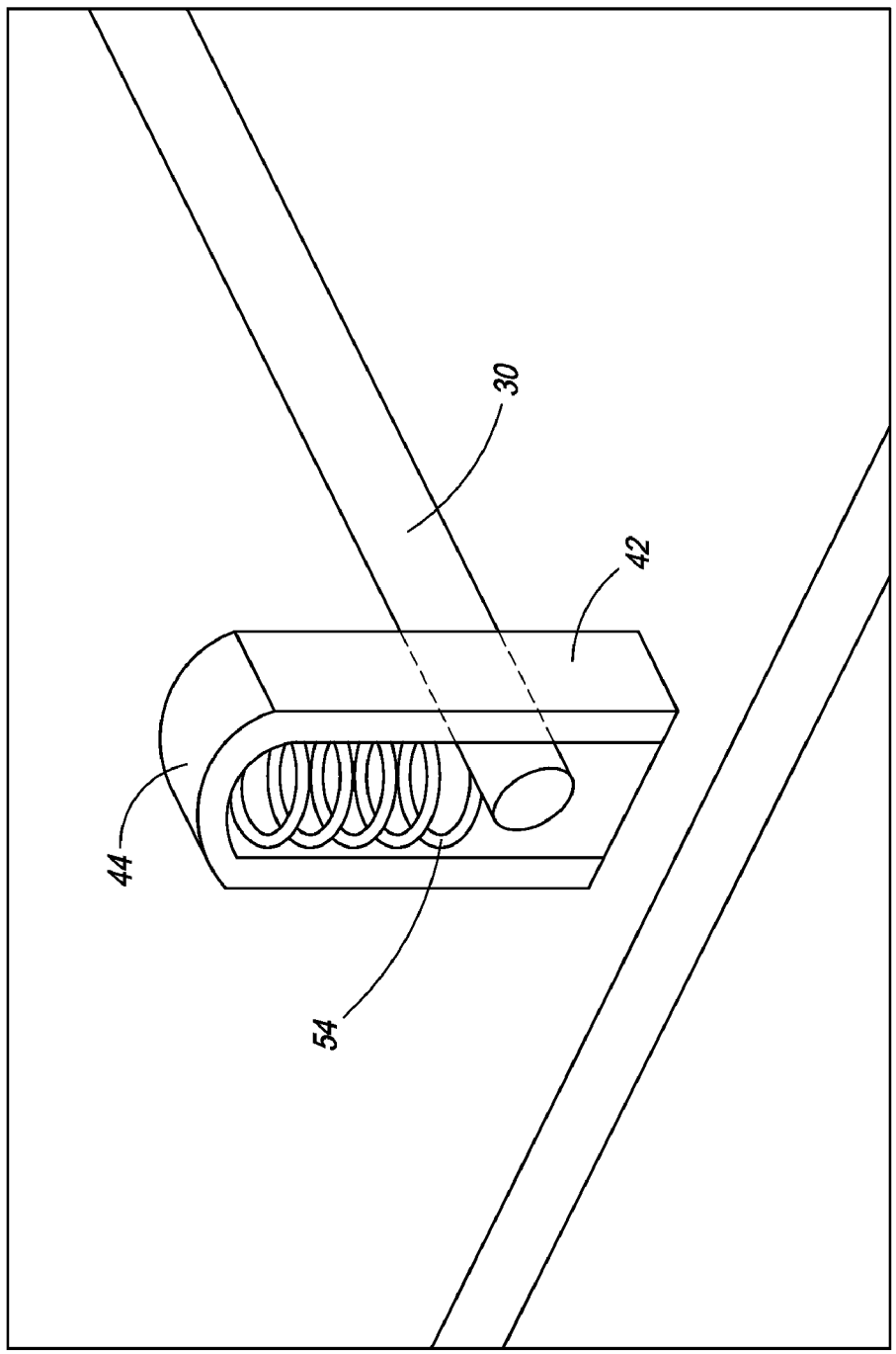
FIG. 12 is a detail view of one embodiment of an elongated member end, guide and tension spring.

FIG. 12 is a detail view of one embodiment of an elongated member end, guide and tension spring. In the exemplary embodiment, an elongated member 30 is operatively connected to a guide 42, at the elongated member's end, to keep movement of the elongated member vertically aligned. In an embodiment, the guide 42 is a molded extension of the tub 24. The guide 42 includes a slot oriented in a plane perpendicular to the plane of the platen 26, and a tension spring 54 is disposed in the slot. The slot supports the tension spring 54 in addition to keeping movement of the elongated member vertically aligned. The guide 42 includes a cap 44, which may be a horizontal structure at the top of the guide 42 such that the cap 44 provides a limit to the distance the elongated member 30 can be biased towards the platen 26 and provides structure to support the tension spring 54. In the exemplary embodiment the tension spring 54 attaches to the cap 44 and to a surface of the elongated member 30.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A scanner, comprising:
    a tub;
    a transparent platen supported over an inside of the tub;
    a first elongated member situated in the tub in a plane parallel to the plane of the platen, and movable within the tub in a plane perpendicular to the plane of the platen;
    a first biasing members operatively connected between the first elongated member and the tub to bias the first elongated member towards the platen wherein each of the biasing members includes a tension spring;
    an image capture module movably supported on the first elongated member such that the image capture module may be moved along a length of the first elongated member; and
    a plurality of gap-maintaining elements operatively connected between the image capture module and the platen to maintain a constant distance between the image capture module and the platen.

2. The scanner of claim 1, wherein the first elongated member is operatively connected to a first plurality of guides to keep movement of the first elongated member aligned in a plane perpendicular to the plane of the platen.

3. The scanner of claim 2, wherein each guide includes a slot oriented in a plane perpendicular to the plane of the platen, and each biasing member is disposed in the slot.

4. The scanner of claim 1, wherein the first plurality of biasing elements includes exactly two biasing elements, each operatively connected to an end of the first elongated member.

5. The scanner of claim 1, further comprising
    a second elongated member that is situated parallel to the first elongated member and is movable within the tub in a plane perpendicular to the plane of the platen,
    a second plurality of biasing members operatively connected between the second elongated member and the tub to bias the second elongated member towards the platen; and
    wherein the image capture module is movably supported on the first and second elongated members such that the image capture module may be moved along lengths of the first and second elongated members.

6. The scanner of claim 1, wherein
    the second elongated member operatively connected to a second plurality of guides to keep movement of the second elongated member aligned in a plane perpendicular to the plane of the platen, and
    each of the second plurality of guides attaches to one of a second plurality of biasing members.

7. The scanner of claim 1, wherein each gap-maintaining member includes a roller operable to roll against the platen.

8. The scanner of claim 1, wherein each gap-maintaining member includes a pad operable to slide along the platen.

9. The scanner of claim 1, wherein the plurality of gap-maintaining members are of substantially equal height.

10. The scanner of claim 1, wherein the elongated member includes a rail.

11. A support structure for an image processing module, comprising:
    a transparent platen supported over an inside of a tub;
    an elongated member situated in the tub in a horizontal plane, the elongated member movable within a tub in a vertical plane, to movable support an image capture module in a horizontal plane,
    a plurality of biasing members operatively connected to the elongated member to urge the elongated member towards the platen, wherein each of the biasing members includes a tension springs; and
    a plurality of a maintaining members to connect to an image capture module and operatively connected to the platen, so as to maintain a constant distance between platen and an image capture module.

12. The support structure of claim 11,
    further comprising a plurality of guides that operably connect to the elongated member so as to keep movement of the elongated member vertically aligned, with each guide comprising a slot oriented in a vertical plane, and wherein each biasing member is situated within the slot.

13. The support structure of claim 11, wherein each gap-maintaining member includes a rolling member operable to roll against the platen.

14. The support structure of claim 11, wherein each gap-maintaining member comprises a pad operable to slide along the platen.

15. The support structure of claim 11 wherein the plurality of gap-maintaining members are of substantially equal height.

16. A scanner, comprising:
    a tub;
    a transparent platen supported over an inside of the tub;
    a rail movable within the tub in a plane perpendicular to the plane of the platen;
    two guides operatively connected to the rail, wherein each guide comprises a slot oriented in a plane perpendicular to the plane of the platen to keep movement of the rail aligned in the plane perpendicular to the plane of the platen;
    two biasing members, each including a tension spring and each operatively connected between a rail end and the tub and disposed within one of the slots to bias the rail towards the platen;
    an image capture module movably supported on the rail such that the image capture module may be moved along a length of the rail; and
    a plurality of gap-maintaining members of substantially equal height operatively connected between the image capture module and the platen to maintain a constant distance between the image capture module and the platen.

\* \* \* \* \*

UNITED STATES PATENT AND TRADEMARK OFFICE
CERTIFICATE OF CORRECTION

PATENT NO. : 8,310,735 B2  
APPLICATION NO. : 12/694737  
DATED : November 13, 2012  
INVENTOR(S) : Paul K. Mui et al.

Page 1 of 1

It is certified that error appears in the above-identified patent and that said Letters Patent is hereby corrected as shown below:

In the Claims

In column 7, line 33, in Claim 1, delete "first" and insert -- first plurality of --, therefor.

In column 8, line 2, in Claim 6, delete "member" and insert -- member is --, therefor.

In column 8, line 20, in Claim 11, delete "movable" and insert -- movably --, therefor.

In column 8, line 24, in Claim 11, delete "springs;" and insert -- spring; --, therefor.

In column 8, line 25, in Claim 11, delete "a" and insert -- gap- --, therefor.

Signed and Sealed this  
Sixth Day of August, 2013

Teresa Stanek Rea  
*Acting Director of the United States Patent and Trademark Office*